UNITED STATES PATENT OFFICE.

MAURICE CERESOLE, OF NEUVILLE, FRANCE, ASSIGNOR TO THE BADISCHE ANILIN AND SODA FABRIK, OF LUDWIGSHAFEN, GERMANY.

BENZO-RHODAMINE.

SPECIFICATION forming part of Letters Patent No. 449,520, dated March 31, 1891.

Application filed October 9, 1890. Serial No. 367,580. (Specimens.)

*To all whom it may concern:*

Be it known that I, MAURICE CERESOLE, doctor of philosophy, a citizen of the Swiss Republic, residing at Neuville, in the Department of the Rhône, France, have invented new and useful Improvements in the Manufacture of a New Red Dye-Stuff, of which the following is a specification.

In my Letters Patent Nos. 377,349 and 377,350 I described the invention of two members of a new class of dye-stuffs to which I gave the name of "rhodamines." The said dye-stuffs result from the condensation of one molecule of phthalic anhydride with two molecules of alkylized meta-amido-phenol and are red basic dye-stuffs characterized by the possession of an intense fluorescence, which shows itself most striking upon silk. In the prosecution of my researches in this field I have discovered that a new dye-stuff closely resembling the said rhodamines is produced if in the above reaction the phthalic anhydride be replaced by benzo-trichloride.

From its relation to the above-mentioned rhodamines I call my new dye-stuff "benzo-rhodamine." To obtain it in accordance with my invention I take, for example, ten (10) parts of benzo-trichloride, fifteen (15) parts of dimethyl-meta-amido phenol, and twenty (20) parts of toluene (the parts are by weight) and mix them well in an enameled vessel, which is kept closed, so as to prevent as far as possible the access of air. The temperature is then gradually raised by heating on the water-bath to nearly 100° centigrade and maintained thereat for, say, about four to five hours. The toluene used does not take part in the reaction, but merely acts as a diluting medium, and any other suitable substance may be employed instead. If no diluent be used, the reaction takes place more energetically and is less easily regulated. After the above operation of melting is completed the product consists of two layers, the upper of which is chiefly toluene and is poured off from the lower one, which contains the coloring-matter. The residual toluene and any excess of benzo-trichloride are separated from this mass by distilling in steam. The crude coloring matter remaining behind is then dissolved in hot water containing a little hydrochloric acid, and the solution filtered when cold to get rid of insoluble, resinous, and other impurities. Common-salt solution is next added until the coloring-matter begins to separate out, when zinc-chloride solution is added to render the precipitation practically complete. These purifying operations—namely, the dissolving in hot water containing a trace of hydrochloric acid, filtering, and precipitating the coloring-matter by means of solutions of common salt and zinc chloride—are repeated until the desired purity is attained. The product is then pressed and dried. The product thus obtained is the zinc double chloride of the base, and can be converted into the hydrochlorate by redissolving it in hot water, adding a caustic alkali, extracting the base thus set free by means of a suitable solvent, such as benzine, and shaking up the benzine solution with the requisite quantity of warm hydrochloric acid, from which after cooling or evaporating, if necessary, the hydrochlorate of benzine-rhodamine crystallizes out. It has probably the constitution represented by the formula:

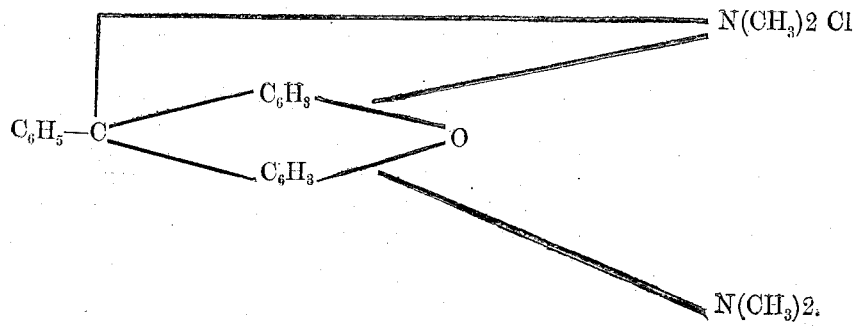

It is obtained either in green needles of metallic luster or in the form of a brown powder. It is soluble in cold water, more readily so in hot water, and readily soluble even when slightly impure in water containing a little hydrochloric acid. From these solutions alkalies throw down the base as a reddish flocculent precipitate. It is readily soluble in alcohol, and the red alcoholic solution shows most strikingly the yellowish-orange fluorescence. It is insoluble in ether and benzine. Its solution in concentrated sulphuric acid is orange-yellow and in hydrochloric acid scarlet red. It differs from the known rhodamines in its ultimate composition, as shown by analysis and in having greater affinity for vegetable fiber. The color of its sulphuric-acid solution is orange-yellow when compared with the greenish-yellow solution of tetraethyl-rhodamine. It dyes in general similarly to the tetramethyl and ethyl rhodamines, resembling them in its beauty of color and fluorescence, which, as with them, shows best in silk. The shades obtained with it are somewhat bluer.

What I claim as new, and desire to secure by Letters Patent, is—

As a new article of manufacture, the hereinbefore-described red dye-stuff benzo-rhodamine, which is characterized by the following properties: It is soluble in cold water, more soluble in hot, readily soluble, even when slightly impure, in water containing a little hydrochloric acid, readily soluble in alcohol, the red solution showing the striking yellowish-orange fluorescence, insoluble in ether and benzine, soluble in concentrated sulphuric acid with an orange-yellow color, and in hydrochloric acid giving a scarlet-red solution.

In testimony whereof I have hereunto set my hand in the presence of two subscribing witnesses.

M. CERESOLE.

Witnesses:
EDM. B. FAIRFIELD,
GEO. DAY FAIRFIELD.